United States Patent
Sautter et al.

(10) Patent No.: US 6,178,281 B1
(45) Date of Patent: Jan. 23, 2001

(54) METHOD FOR THE MANUFACTURE OF OPTICAL COMPONENTS, AND OPTICAL COMPONENT

(75) Inventors: Helmut Sautter, Ditzingen; Jörg Blechschmidt, Renningen; Rainer Schink, Leonberg; Jürgen Graf, Stuttgart; Peter Loeffler, Saulgau, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/117,597

(22) PCT Filed: Jan. 31, 1997

(86) PCT No.: PCT/DE97/00184

§ 371 Date: Oct. 30, 1998

§ 102(e) Date: Oct. 30, 1998

(87) PCT Pub. No.: WO97/28473

PCT Pub. Date: Aug. 7, 1997

(30) Foreign Application Priority Data

Feb. 3, 1996 (DE) .............................. 196 03 936
Jan. 28, 1997 (DE) .............................. 197 02 969

(51) Int. Cl.[7] .......................... G02B 6/10; C03B 37/022
(52) U.S. Cl. ......................... 385/129; 385/14; 385/130; 385/131; 385/141; 65/385; 65/386; 65/388; 65/389
(58) Field of Search .................... 385/14, 129, 132, 385/141, 130, 131; 438/29, 31; 65/385, 386, 388, 389

(56) References Cited

U.S. PATENT DOCUMENTS

| | | | |
|---|---|---|---|
| 4,286,838 | * 9/1981 | Huignard et al. | 385/129 X |
| 4,560,249 | * 12/1985 | Nishiwaki et al. | 385/37 X |
| 4,851,025 | * 7/1989 | Siefert et al. | 65/31 |
| 5,136,677 | 8/1992 | Martin et al. | 385/123 |
| 5,285,517 | * 2/1994 | Wu | 385/142 |
| 5,480,764 | * 1/1996 | Gal et al. | 385/129 X |
| 5,841,928 | * 11/1998 | Maxwell et al. | 385/129 |

FOREIGN PATENT DOCUMENTS

| | | | |
|---|---|---|---|
| 687 925 | 12/1995 | (EP) | 385/129 X |
| 58-171 005 | 10/1983 | (JP) | 385/129 X |
| 60-007 405 | 1/1985 | (JP) | 385/129 X |
| 60-175 010 | 9/1985 | (JP) | 385/129 X |
| 61-236 506 | 10/1986 | (JP) | 385/129 X |

* cited by examiner

Primary Examiner—Brian Healy
(74) Attorney, Agent, or Firm—Kenyon & Kenyon

(57) ABSTRACT

A method for the manufacture of optical components, at least one three-dimensional optical waveguide structure being produced in a light-sensitive substrate by locally subjecting the substrate to an exposure so that a difference in refractive index between the substrate and the at least one optical waveguide structure is created. Provision is made for an exposure to occur at least twice, at different angles of incidence for the light perpendicular to a light wave propagation direction of the optical waveguide structure; the substrate surrounding what will later be the optical waveguide structure thereby experiences a diminution in refractive index, the optical waveguide structure being defined using a mask.

10 Claims, 3 Drawing Sheets

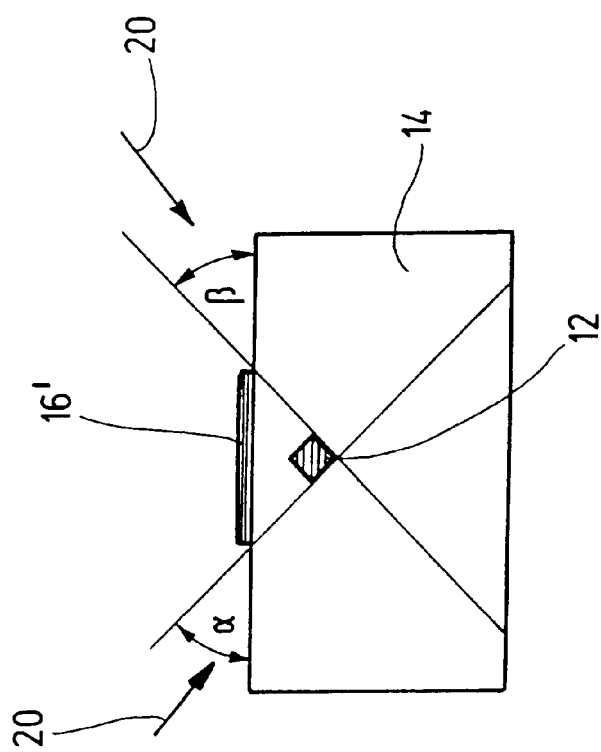
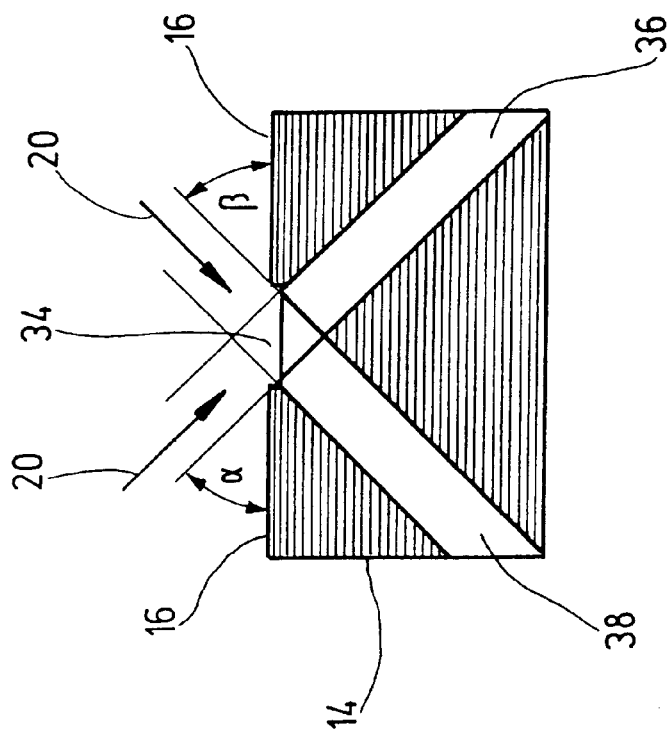
Fig. 5a
Fig. 5b

METHOD FOR THE MANUFACTURE OF OPTICAL COMPONENTS, AND OPTICAL COMPONENT

FIELD OF THE INVENTION

The present invention relates to a method for the manufacture of optical components, at least one three-dimensional optical waveguide structure being produced in a light-sensitive substrate by locally subjecting the substrate to an exposure so that a difference in refractive index between the substrate and the at least one optical waveguide structure is created. The present invention also relates to an optical component.

BACKGROUND INFORMATION

Optical components having integrated optical waveguide structures are known. These optical waveguide structures possess a difference in refractive index as compared to the substrate surrounding them, so that they are suitable for guiding light waves. A conventional method is described, for example, in U.S. Pat. No. 5,136,677, in which the chalcogenide glasses are subjected locally to an exposure in order to produce the optical waveguide structure. An exposure occurs here in relatively thin substrates, in the light wave transmission direction of what will later be optical waveguide structures. It is also known from U.S. Pat. No. 5,136,677 that intersecting optical waveguide structures can be created in a substrate using two different light sources, and that the optical properties of the optical waveguide structures can be influenced using interference phenomena.

It is known, in order to allow the optical waveguide structures, once produced, to guide electromagnetic waves, for example light waves, that they must have a refractive index which is typically a few percent higher than the substrate surrounding the optical waveguide structure. In addition, the dimensions for the optical waveguide structures lying perpendicular to the light wave propagation direction must be selected so that they are on the order of the wavelength of the light to be guided, typically from 1 to 10 $\mu$m. Using the difference in refractive index between the optical waveguide structure and the substrate, and the dimensions of the optical waveguide structures, it is possible to establish the number of modes of light waves being transmitted for a given wavelength being guided. This defined refractive index difference, with the necessary small dimensions, can be achieved with the conventional methods for the manufacture of optical waveguide structures only at the cost of substantial losses.

The optical waveguide structures are usually produced in integrated optical components which are configured, for example, as amplifiers, splitters, couplers, multiplexers, or switches. For this purpose, optical fibers, for example glass fibers, which feed signals in and out are coupled to the optical waveguide structures in the optical components. The problem arises here that the glass fiber cross section must be coupled to the optical waveguide cross section. The effective cross section for common glass fibers is 5 to 10 $\mu$m. With integrated optical components, it is advisable to work with smaller cross sections, for example in order to increase the energy density in the optical waveguide structures or to spatially delimit light guidance so that the physical size of the integrated optical components can be reduced. Because of the difference in cross sections at the coupling point, attention must be paid to the numerical aperture, which describes the angular region from which an optical fiber can accept incident light. Light which is incident at a limit value greater than one corresponding to the numerical aperture cannot be guided, and is lost. On the other hand, the small cross section of the optical waveguide structures in the integrated optical components necessarily results in an increase in the numerical aperture, so that light signals sent out from the integrated optical components can be only partially transferred into the coupled glass fibers.

In order to mitigate this problem and the losses associated therewith, it is known to provide a so-called "taper" between the optical waveguide structures and the glass fibers, as a transitional structure. This is intended to effect a continuous transition for the effective cross sections of the glass fibers and the optical waveguide structures, and for the numerical aperture.

The taper can be only incompletely configured using the conventional manufacturing methods for optical waveguide structures, in which optical waveguide structures are produced in, for example, glass, polymer, or Ormocer substrates or in surface layers of silicon wafers using ion exchange, a local change in the stoichiometry of oxides or oxynitrides, or a local filling of etched or stamped valley structures. Because of the limited depth of the layer thickness, cross-sectional adaptation can be accomplished only by expanding the waveguide cross section while the depth remains the same. The refractive index is often defined by the material properties, and is therefore constant over the entire taper. The result can be that the taper becomes entirely or partially multimodal, i.e. that propagation directions which cannot be received by the adjacent optical waveguide or glass fibers become possible within it.

SUMMARY OF THE INVENTION

The method according to the present invention has an advantage that highly precise optical waveguide structures, configured in particular as tapers, with which optical waveguide structures and glass fibers can be coupled in low-loss fashion, can be created with simple technical means. Because an exposure occurs at least twice, at different angles of incidence for the light perpendicular to the light wave propagation direction of the optical waveguide structure, the substrate surrounding what will later be the optical waveguide structure experiences a diminution in refractive index, the optical waveguide structure being defined using a mask which preferably has a width which varies in the light wave propagation direction; as a result, three-dimensional optical waveguide structures can be achieved which have not only an expansion of the optical waveguide cross section but also an increasing depth. It is thereby possible, very advantageously, to create cross sections of optical waveguide structures, in the coupling region to glass fibers, with which it is possible to adapt the effective cross sections of the optical waveguide structures and the glass fibers.

A preferred exemplary embodiment of the present invention provides for the angles of incidence of the exposure in the light wave propagation direction to be variably adjustable. This allows a further optimization of the cross-sectional adaptation via the taper, for example by the fact that the latter has a cross section which is triangular when viewed in cross section and expands in trumpet-like manner from the optical waveguide structure toward the glass fiber.

In a further preferred exemplary embodiment of the present invention, provision is made for the mask to have, outside the optical waveguide structure, a transparency which varies in the light wave propagation direction. This advantageously makes it possible to vary the difference in refractive index between the optical waveguide structure and the substrate surrounding the optical waveguide structure in defined manner, so that, in particular in the case of an increase in the cross section of the optical waveguide structure, the difference in refractive index decreases in defined manner to ensure that the optical waveguide structure is monomodal in the light wave propagation direction as the cross section increases.

Provision is also made, in a preferred exemplary embodiment of the present invention, for the angle of incidence of the exposure to be established so as to result in buried optical waveguide structures. The result of this is that additional covering of the optical waveguide structure that is produced, to prevent external influences, is no longer necessary. The entire process for manufacturing the optical components having the optical waveguide structures is thereby simplified.

Provision is moreover made, in a preferred exemplary embodiment of the present invention, for the exposure to be accomplished at different angles of incidence with a varying mask, in order to produce buried optical waveguide structures. The highly advantageous result of this is that in addition to a buried optical waveguide structure, a further optimization of the cross section of the optical waveguide structure at the coupling point between the optical waveguide structure and a glass fiber is achieved. It becomes possible to arrive at rhomboidal (diamond-shaped) cross sections for the optical waveguide structures, with cross sections which increase in the light wave propagation direction. A further optimized adaptation of the effective cross sections between the optical waveguide structure and a glass fiber thereby becomes possible.

BRIEF DESCRIPTION OF THE DRAWINGS

FIG. 5a shows process steps for the manufacture of a buried optical waveguide structure in a second exemplary embodiment.

FIG. 5b shows other process steps for the manufacture of a buried optical waveguide structure in the second exemplary embodiment.

DETAILED DESCRIPTION OF THE INVENTION

Figure 1:
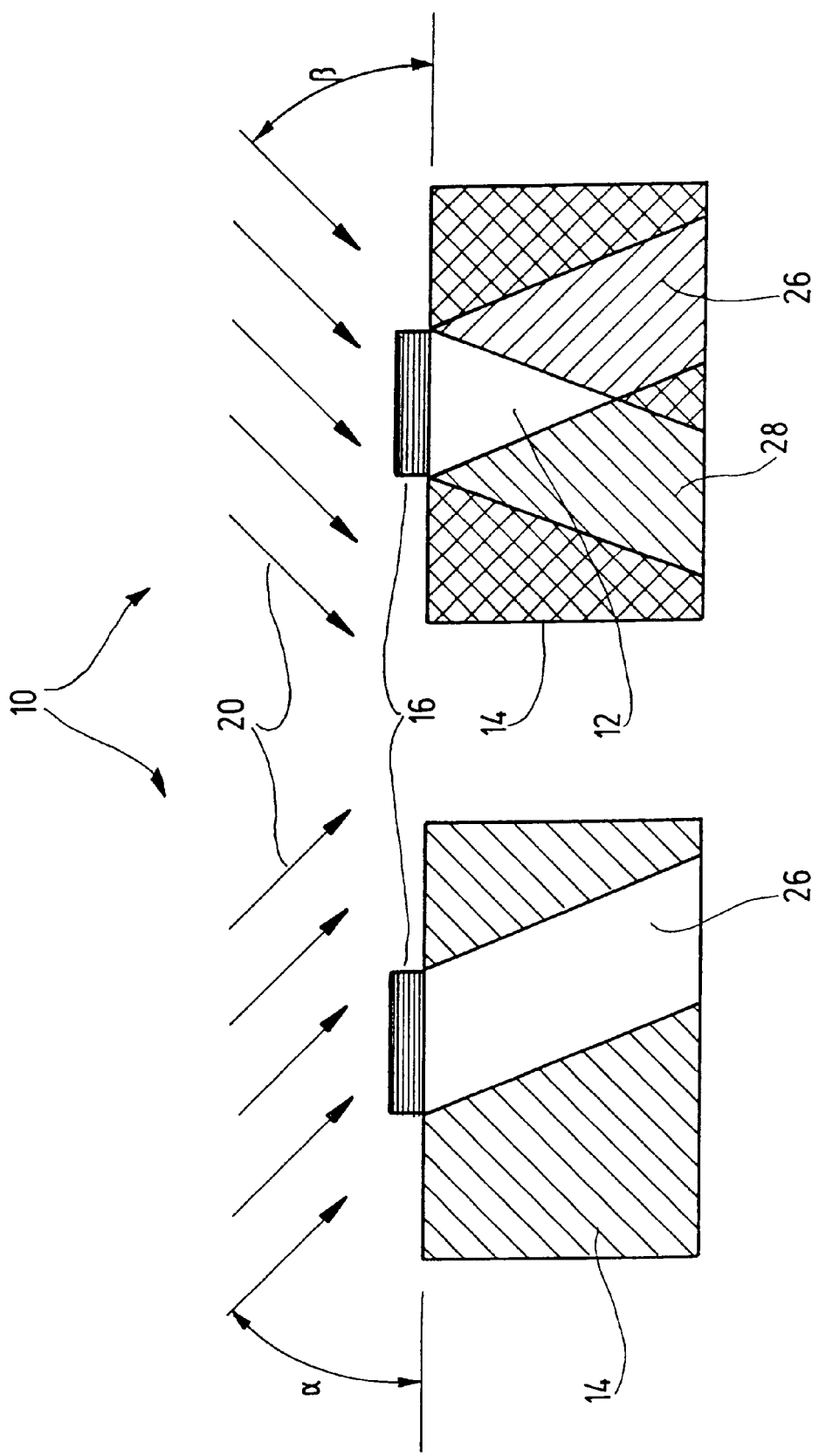
FIG. 1a shows process steps for the manufacture of an optical component according to a first exemplary embodiment of the present invention.
FIG. 1b shows other process steps for the manufacture of the optical component of the first exemplary embodiment.

FIGS. 1a and 1b respectively show a schematic sectioned depiction of an optical component 10, with reference to which the method according to the present invention for the manufacture of an optical waveguide structure 12 will be explained. The assumption used for the explanation of the method according to the present invention is that of the simplest construction of an optical component, i.e. the existence of only one optical waveguide structure 12. It is possible, using the method according to the present invention, to produce simultaneously a plurality of optical waveguide structures 12 having different dimensions.

Optical component 10 is made of a chalcogenide glass 14. The chalcogenide glasses are generally understood to be amorphous, non-stoichiometric compounds of the chalcogens. The sulfides and selenides of arsenic (As), antimony (Sb), germanium (Ge), gallium (Ga), indium (In), bismuth (Bi), and lanthanum (La) are preferred, along with their mixtures if they form glass phases. Mixed systems made up of chalcogenides and halides, for example fluorides, chlorides, bromides, and iodides, which lead to the creation of so-called chalcohalide glasses, are also possible.

The glass used—in the exemplary embodiment, chalcogenide glass 14—is equipped with a mask 16 which is made of an opaque material. Mask 16 is adapted in terms of its dimensioning, in a manner yet to be explained, to optical waveguide structure 12 that is to be created. Mask 16 can be applied onto chalcogenide glass 14 using conventional methods, for example by screen printing.

In a first process step (FIG. 1a), an exposure of chalcogenide glass 14 equipped with mask 16 occurs, a light 20 (exposure 20) incident to the surface of chalcogenide glass 14 at an angle of incidence $\alpha$ first being produced by a source (not depicted). The photoenergies of light 20 that are used lie in the absorption range of chalcogenide glass 14. The wavelength of light 20 is thus usually in the visible range or in the near ultraviolet range. The wavelengths of light 20 can be, for example, between 200 nm and 600 nm.

Light 20 that is incident at angle of incidence $\alpha$ strikes chalcogenide glass 14 except in a region 26 that is shaded by mask 16, and therein (with the exception of shaded region 26) leads to a diminution in the refractive index of chalcogenide glass 14. Shaded region 26 thus possesses a higher refractive index than the remaining substrate of chalcogenide glass 14.

The degree to which the refractive index is decreased can be adjusted via an exposure duration and/or an exposure intensity and/or the wavelength of light 20. The exposure intensity of light 20 is, for example from approximately 1 to 100 J/cm$^2$. Exposure by light 20 usually takes place at room temperature and in a standard atmosphere, so that no additional equipment outlay is required to maintain specific requisite process conditions.

Subsequently, in accordance with the process step shown in FIG. 1b, an exposure is performed with light 20 at an angle of incidence $\beta$, so that an exposure of chalcogenide glass 14 takes place with the exception of a region 28 shaded by mask 16. Because angle of incidence $\beta$ differs from angle of incidence $\alpha$, shaded region 26 shown in FIG. 1a is partially exposed, so that a diminution in refractive index also occurs here. The region respectively shaded (i.e. unexposed) during the two exposure steps depicted in FIGS. 1a and 1b leads to the formation of optical waveguide structure 12, since the latter has a higher refractive index than the environment, i.e. than the substrate of chalcogenide glass 14. The dimensioning of optical waveguide structure 12, in particular its depth, can be varied by selecting angles of incidence $\alpha$ and $\beta$. A further dimensioning of optical waveguide structure 12, in particular of its width and length, can be established by dimensioning mask 16.

By combining different exposures, i.e. different angles of incidence $\alpha$ and $\beta$, different exposure intensities, different wavelengths of light 20, and/or different exposure durations, an optical waveguide structure 12 with any defined dimensions and any magnitude of change in refractive index as compared with the substrate of chalcogenide glass 14 can be produced.

Figure 2:
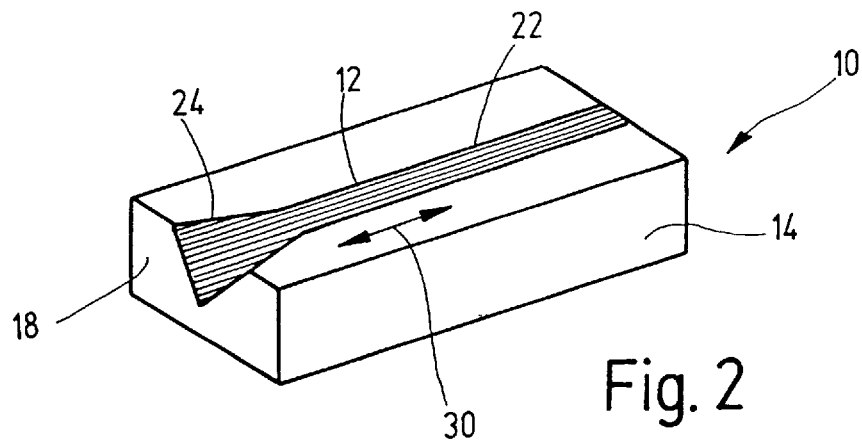
FIG. 2 shows a schematic view of the optical component including an optical waveguide structure.

FIG. 2 shows, in a schematic perspective view, a component 10 which has an integrated optical waveguide 12.

Optical waveguide 12 possesses a channel-shaped section 22 and, facing an end face 18, a transition region hereinafter called a taper 24. Taper 24 possesses at end face 18 a triangular cross section which transitions, becoming continuously smaller, into section 22. If it has been manufactured, for example, using the method explained with reference to FIGS. 1a and 1b, section 22 can also have a triangular cross section. What essentially occurs, therefore, is a funnel-shaped expansion of the cross section of the entire optical waveguide structure 12, via taper 24, toward end face 18. Taper 24 can be achieved by a suitable configuration of mask 16 and a suitable incidence of light 20 during the exposure. For this purpose, mask 16 possesses, when viewed in plan view, a contour which expands in trapezoidal or triangular shape toward end face 18, so that a shaded region corresponding to what will later be taper 24 is created during exposure 20 (FIGS. 1a, 1b).

Angles of incidence α and β of exposure 20 can be defined either using a light source mounted in suitably movable fashion, or a corresponding movement of chalcogenide glass 14 while exposure 20 remains uniformly aligned. In addition to angles of incidence α and β which are considered in FIGS. 1a and 1b to be in the plane of the drawing, a rotation into or out of the plane of the drawing can also occur here, so that optimally adapted tapers 24 can be attained.

Taper 24 is used to achieve the adaptation, mentioned above, of the effective cross sections of optical waveguide structure 12, in particular its section 22, to a glass fiber (not depicted). Taper 24 results in a continuous transition, in the light wave transmission direction marked with an arrow 30 in FIG. 2, both in the cross section of optical waveguide structure 12 and in numerical aperture. Arrow 30 is characterized as a double arrow, since optical waveguide structure 12 that is shown can serve both to receive an optical signal and to send out an optical signal of component 10. The triangular cross-sectional area of taper 24 at end face 18 results in an optimized adaptation to a round cross section of the glass fiber (not depicted).

Figure 3:
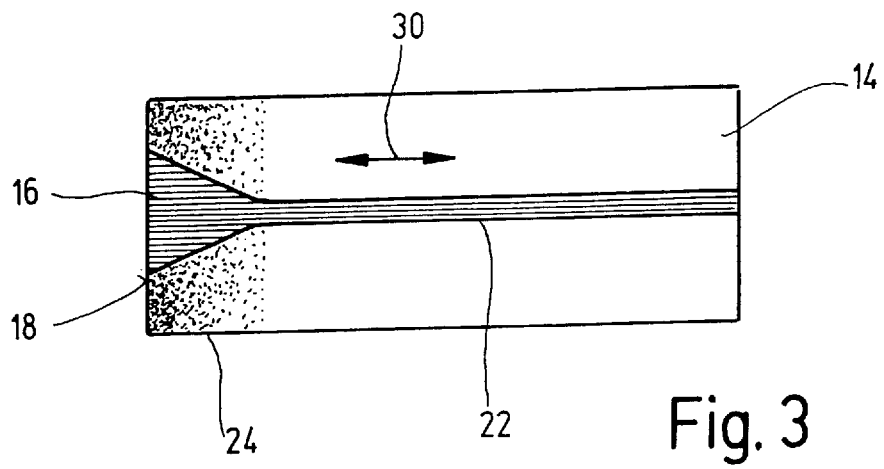
FIG. 3 shows a schematic view of a mask for the manufacture of the optical waveguide structure.

FIG. 3 shows a schematic plan view of a chalcogenide glass 14 equipped with mask 16. Mask 16 defines on the one hand channel-shaped section 22 and taper 24 of what will later be optical waveguide structure 12. As explained with reference to FIGS. 1a and 1b, optical waveguide structure 12 is produced by the fact that an exposure of chalcogenide glass 14 occurs in such a way that an unexposed region, forming optical waveguide structure 12, remains. In order to ensure monomodality in the region of taper 24 over its length as viewed in light wave propagation direction 30, a difference in refractive index between optical waveguide structure 12 and the substrate of chalcogenide glass 14 must decrease in defined fashion, in the region of taper 24, in the direction of end face 18. This is achieved by the fact that mask 16 is configured so that a transparency to light 20, which must exist outside the structure of taper 24 in order to attain the previously described diminution in refractive index therein, decreases in the direction of the cross-sectional expansion of taper 24, i.e. in the direction of end face 18. A uniform decrease in transparency to light 20 in the direction of end face 18 results in a correspondingly uniformly lesser exposure 20 of section 22 of optical waveguide structure 12 viewed in the direction of end face 18. This results in a correspondingly lesser diminution in refractive index in the substrate of chalcogenide glass 14 in the longitudinal extension of taper 24, so that a difference between the refractive index of taper 24 and the refractive index of the substrate of chalcogenide glass 14 also decreases uniformly from section 22 in the direction of end face 18.

Figure 4:
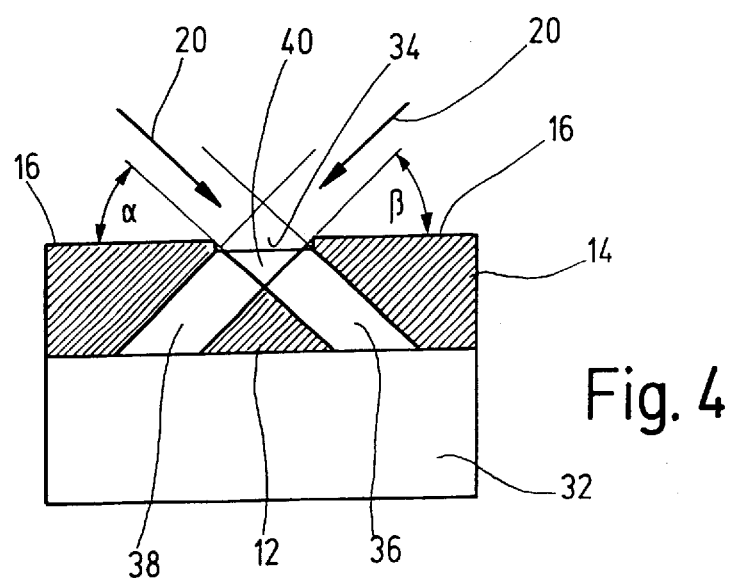
FIG. 4 shows process steps for the manufacture of a buried optical waveguide structure according to the first exemplary embodiment.

FIGS. 4, 5a and 5b show the manufacture of buried optical waveguide structures 12 by exposure 20 at a variety of angles of incidence α and β. The manufacture of buried optical waveguide structures eliminates the need for a subsequent covering of the optical waveguide structures in order to protect them from external influences. The Figures which follow respectively show a schematic plan view of end face 18 of a component 10, it being clear that using the corresponding configuration of mask 16 already explained, both the channel-shaped section 22 and taper 24 of optical waveguide structure 12 can be achieved.

In accordance with the exemplary embodiment shown in FIG. 4, a layer of chalcogenide glass 14 is applied onto a support substrate 32. A mask 16 is applied directly onto chalcogenide glass 14 in such a way that a mask opening 34 remains in the region of what will later be optical waveguide structure 12. Exposure 20 takes place first at angle of incidence α, thus resulting, because of the oblique incidence, in a tunnel-shaped section 36 which has a refractive index diminished by the exposure and extends through chalcogenide glass 14 to support substrate 32. Exposure 20 then takes place through mask opening 34 at angle of incidence β, thus resulting again in a tunnel-shaped section 38, also having a refractive index diminished by the exposure. Tunnel-shaped sections 36 and 38 enclose a section that is triangular when viewed in cross section, which yields optical waveguide structure 12, since no diminution in refractive index has taken place in this region so that the latter has an elevated refractive index as compared with tunnel-shaped sections 36 and 38. Depending on the selection of angles of incidence α and β, there results above optical waveguide 12 a region 40 belonging both to section 36 and to section 38, which because of the exposure that is in fact doubled in this case, has experienced a diminution in refractive index. Optical waveguide structure 12 is thereby buried in chalcogenide glass 14 applied onto support substrate 32, and is delimited by support substrate 32 and by sections 36 and 38.

A further possibility for achieving a buried optical waveguide structure 12 is shown by FIGS. 5a and 5b. First, as shown in FIG. 5a, in a manner similar to FIG. 4, an unexposed region is produced that is triangular in shape when viewed in cross section and is delimited laterally by exposed tunnel-shaped sections 36 and 38.

In a subsequent step shown in FIG. 5b, mask 16 according to FIG. 5a is removed in suitable fashion and a mask 16' is applied which covers the region of chalcogenide glass 14 that was initially uncovered by mask opening 34. As a result of subsequent exposure at angles of incidence α and β, respectively, further portions of chalcogenide glass 14 are exposed. All that remains is an unexposed region that is rhomboidal or diamond-shaped when viewed in cross section, which remains shaded both during the double-sided exposure shown in FIG. 5a, by mask 16, and during the double-sided exposure shown in FIG. 5b, by mask 16'. As a result, this region possesses a refractive index that is elevated as compared to the substrate of chalcogenide glass 14, and forms optical waveguide structure 12. A configuration of this kind of optical waveguide structure 12, in conjunction with the continuous cross-sectional expansion of taper 24 explained with reference to FIGS. 2 and 3, makes it possible, by suitably varying masks 16 and 16' and angles of incidence α and β, to produce a taper 24 which is adapted on the one hand to buried channel-shaped sections 22 (FIGS. 2 and 3), and to glass fibers (not depicted). The cross-sectional expansion of taper 24 in the direction of end face 18 then extends not only laterally and depthwise, but also in the direction of the surface of chalcogenide glass 14. This makes possible an even more exact approximation of the cross section of taper 14 to a circular cross section of a glass fiber.

What is claimed is:

1. A method for manufacturing an optical component, comprising the steps of:

(a) locally exposing a light-sensitive substrate to a light to provide a difference between a first refractive index of the light-sensitive substrate and a second refractive index of at least one region, the at least one region forming at least one three-dimensional optical waveguide structure in the light-sensitive substrate, wherein the light-sensitive substrate is composed of one of a chalcogenide glass and a chalcohalide glass;

(b) performing step (a) at least twice at a first incidence angle of the light and at a second incidence angle of the light, the first and second incidence angles being perpendicular to a light wave propagation direction of the at least one three-dimensional optical waveguide structure, wherein the first incidence angle is different from the second incidence angle; and (c) surrounding the at least one three-dimensional optical waveguide structure with the light-sensitive substrate, the light-sensitive substrate experiencing a diminution in the first refractive index, wherein the at least one three-dimensional optical waveguide structure is defined using at least one mask.

2. The method according to claim 1, further comprising the step of:

(d) determining a taper of the at least one three-dimensional optical waveguide structure using a width of the at least one mask, the width varying in the light wave propagation direction.

3. The method according to claim 2, further comprising the step of:

(e) increasing the width in the light wave propagation direction in a region of the taper.

4. The method according to claim 3, further comprising the step of:

(f) decreasing a transparency of the at least one mask in a second region of the taper to expose the light in a direction of a cross-sectional expansion of the taper, wherein the second region is above the light-sensitive substrate surrounding the taper.

5. The method according to claim 1, further comprising at least one of the steps of:

(g) variably adjusting the first and second incidence angles in the light wave propagation direction; and (h) variably adjusting the first and second incidence angles transverse to the light wave propagation direction.

6. The method according to claim 1, further comprising the step of:

(i) selecting the first and second incidence angles to form the at least one three-dimensional optical waveguide structure.

7. The method according to claim 1, further comprising the step of:

(j) performing step (b) using a first mask of the at least one mask and a second mask of the at least one mask, wherein the first mask is different from the second mask.

8. The method according to claim 1, further comprising the step of:

(k) using a movably mounted light source to determine the first and second incidence angles.

9. The method according to claim 8, further comprising the step of:

(l) movably positioning the light-sensitive substrate with respect to the movably mounted light source for determining the first and second incidence angles.

10. An optical component, comprising:

a light-sensitive substrate composed of one of a chalcogenide glass and a chalcohalide glass; and at least one optical waveguide structure integrated into the light-sensitive substrate, the at least one optical waveguide structure defined using at least one mask, wherein at least one region forms the at least one optical waveguide structure in the light-sensitive substrate, wherein the light-sensitive substrate is locally exposed to a light for providing a difference between a first refractive index of the light-sensitive substrate and a second refractive index of the at least one region, the at least one optical waveguide structure surrounded by the light-sensitive substrate, the light-sensitive substrate experiencing a diminution in the first refractive index, and wherein the light-sensitive substrate is exposed to the light at least twice at a first incidence angle of the light and at a second incidence angle of the light, the first and second incidence angles being perpendicular to a light wave propagation direction of the at least one optical waveguide structure, the first incidence angle being different from the second incidence angle.

* * * * *